United States Patent [19]

Quatse

[11] Patent Number: 4,683,530
[45] Date of Patent: Jul. 28, 1987

[54] SERIAL INFORMATION TRANSFER PROTOCOL

[75] Inventor: Jesse T. Quatse, Corte Madera, Calif.

[73] Assignee: Telemecanique Electrique, Nanterre Cedex, France

[21] Appl. No.: 598,644

[22] Filed: Apr. 10, 1984

[51] Int. Cl.[4] ............................................. G06F 13/42
[52] U.S. Cl. ..................................................... 364/200
[58] Field of Search ..................... 340/825.05, 825.07, 340/825.14; 370/85; 364/200 MS File, 900 MS File

[56] References Cited

U.S. PATENT DOCUMENTS

| | | | |
|---|---|---|---|
| 4,103,336 | 7/1978 | Gindi et al. | 364/200 |
| 4,136,384 | 1/1979 | Okada et al. | 364/200 |
| 4,170,038 | 10/1979 | Bouvier | 364/200 |
| 4,250,563 | 2/1981 | Struger | 364/900 |
| 4,280,285 | 7/1981 | Hass | 434/30 |
| 4,357,605 | 11/1982 | Clements | 340/825.14 |
| 4,395,756 | 7/1983 | Daniels | 364/200 |
| 4,413,319 | 11/1983 | Schultz et al. | 364/200 |
| 4,468,750 | 8/1984 | Chamoff et al. | 364/900 |
| 4,568,909 | 2/1986 | Whynacht | 340/21 |

*Primary Examiner*—Archie E. Williams, Jr.
*Assistant Examiner*—Florin Munteanu
*Attorney, Agent, or Firm*—Townsend and Townsend

[57] ABSTRACT

An interconnecting transparent serial bus for extending a parallel CPU domain to a parallel peripheral module domain includes a bidirectional serial protocol for transferring information between the CPU and one or more peripheral module controllers, referred to as rack masters. Each rack master provides a parallel path to any number of peripheral modules associated therewith. Serial bus protocol includes a frame line, defining a synchronous information exchange interval; a clock line, for propagating a synchronous information clock signal during the information exchange interval; a sync line, for propagating a sync signal to identify one or more discrete asynchronous information fields during the information exchange interval; and a signal line for propagating data, address, and control information between the CPU and its associated rack masters in serial fashion.

14 Claims, 11 Drawing Figures

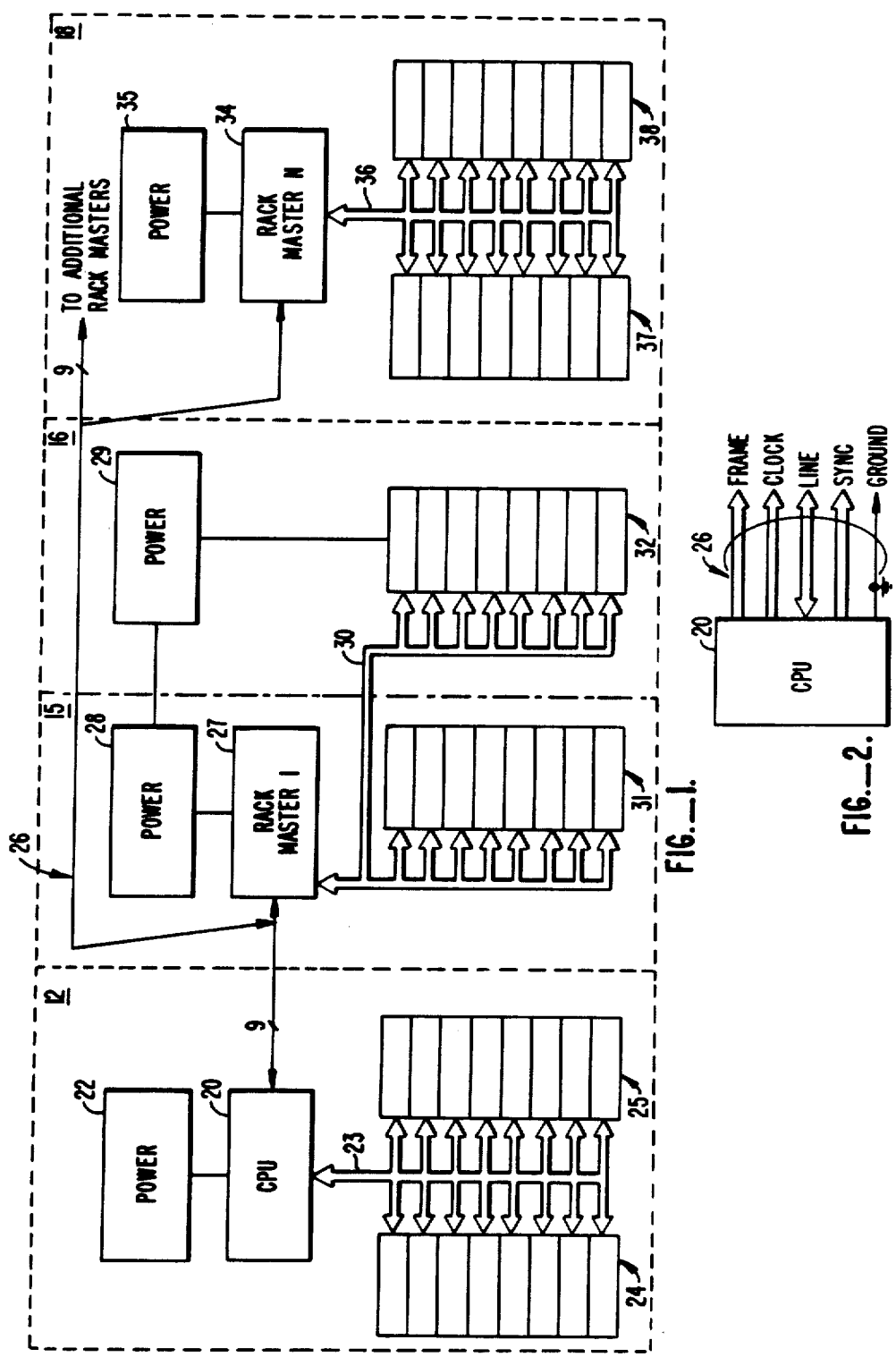

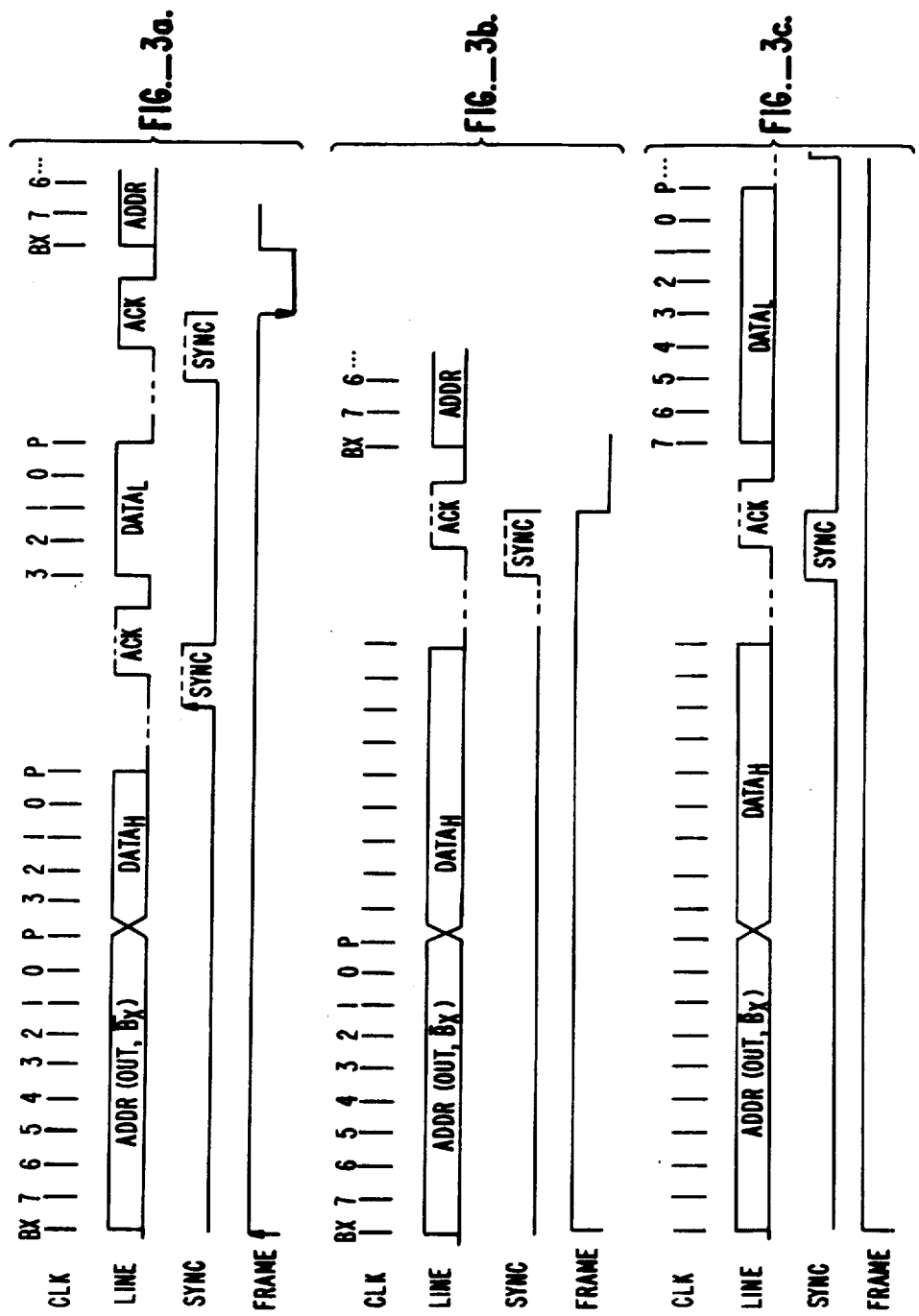

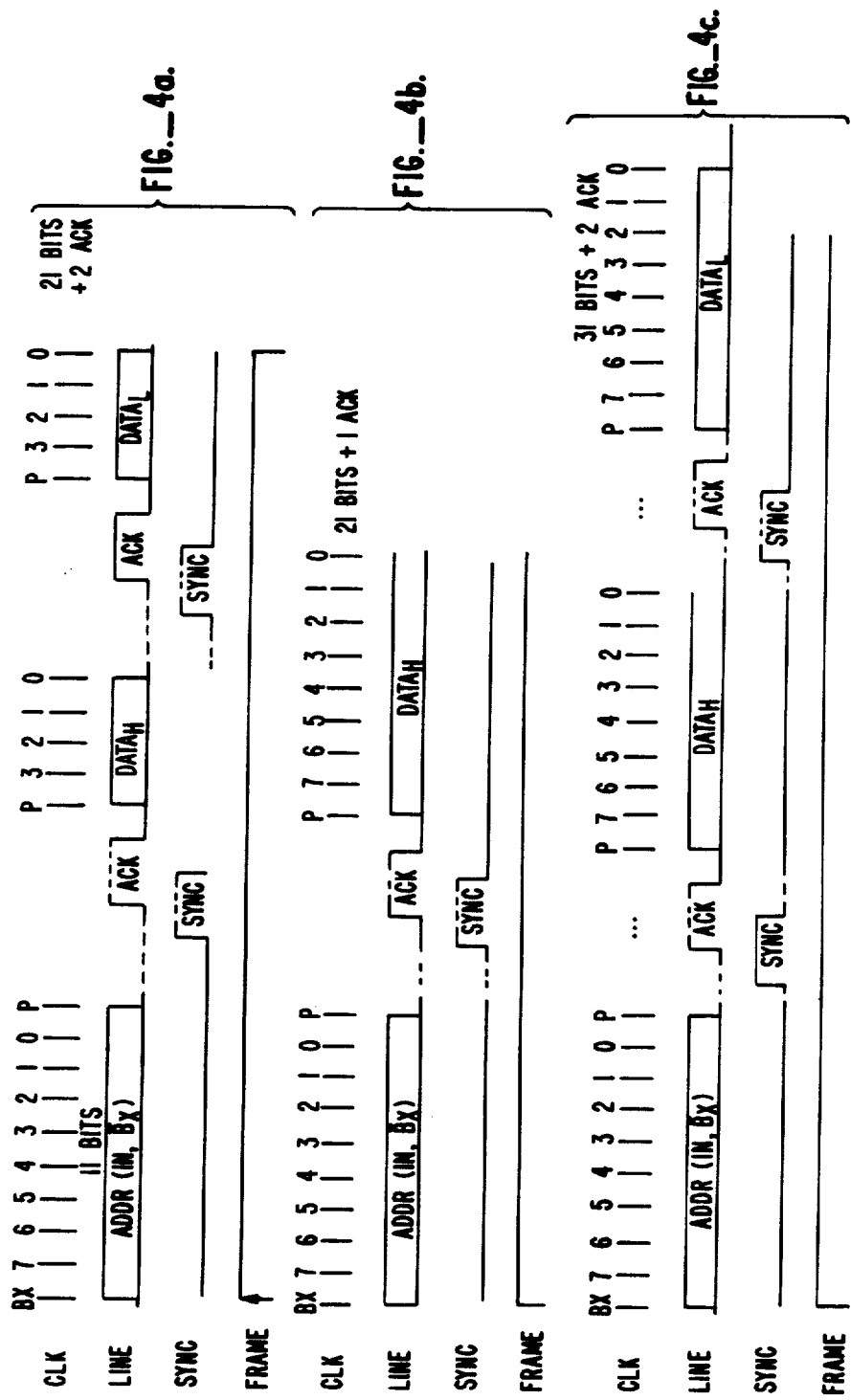

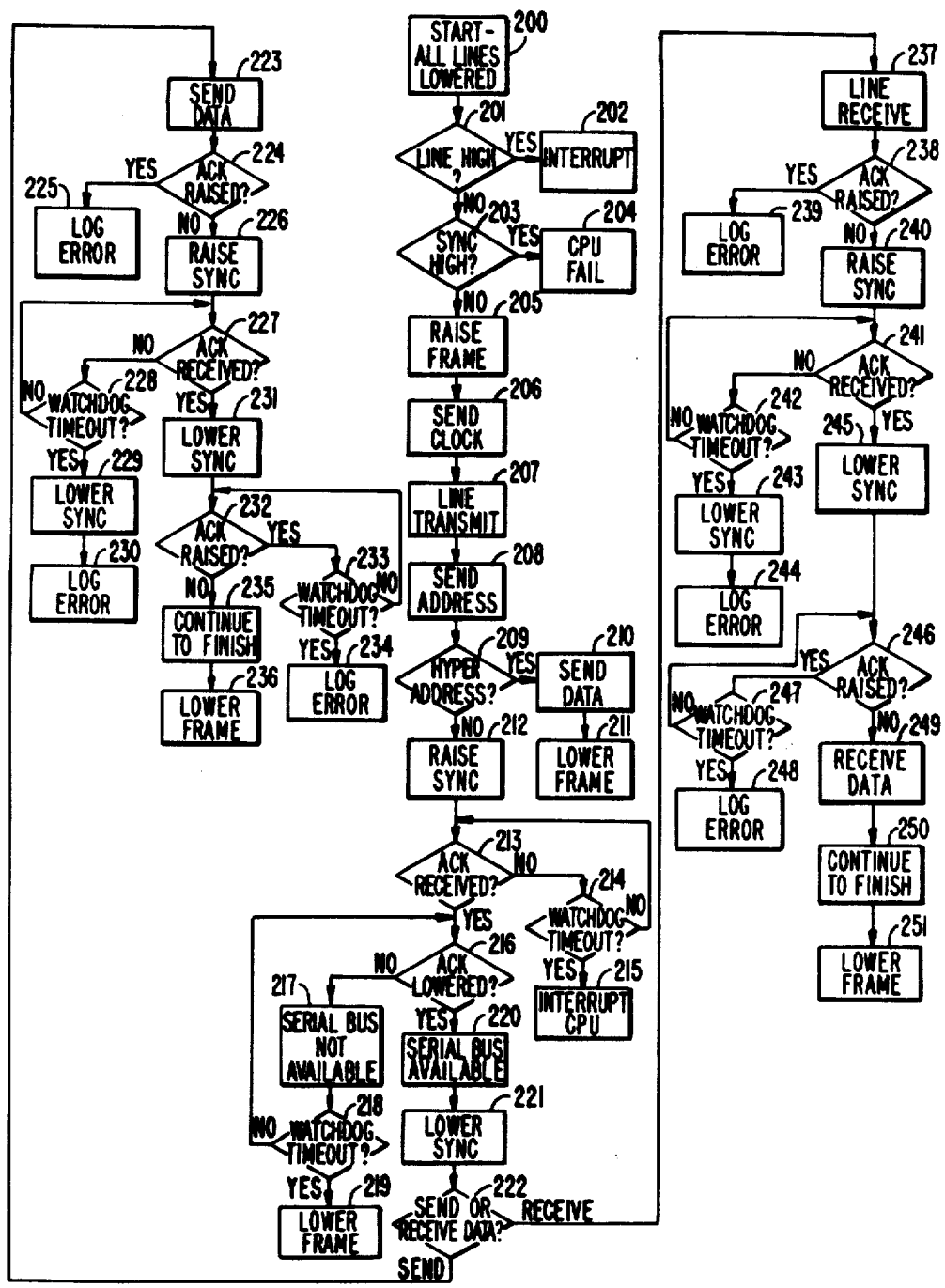
FIG._5.

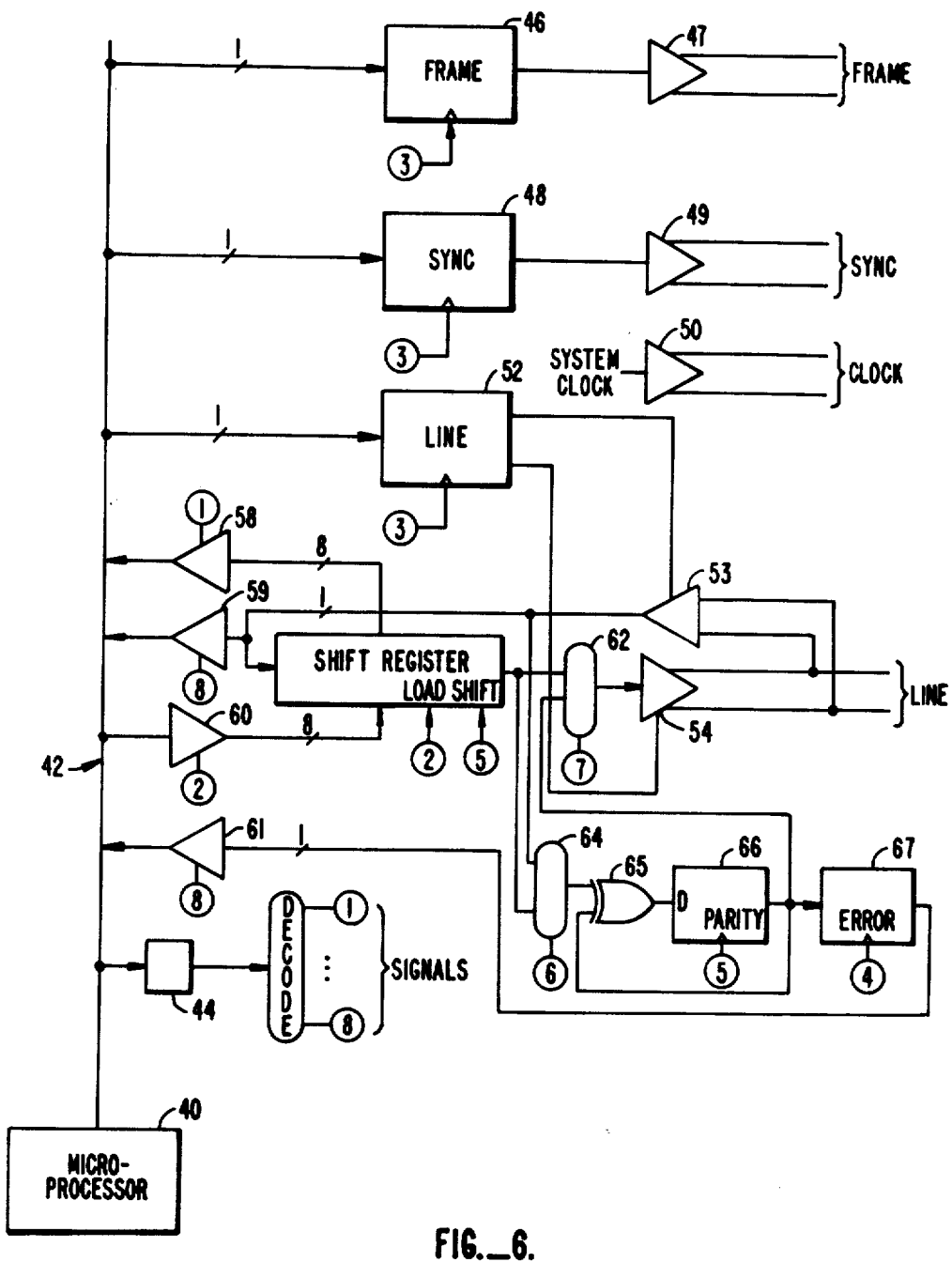
FIG._6.

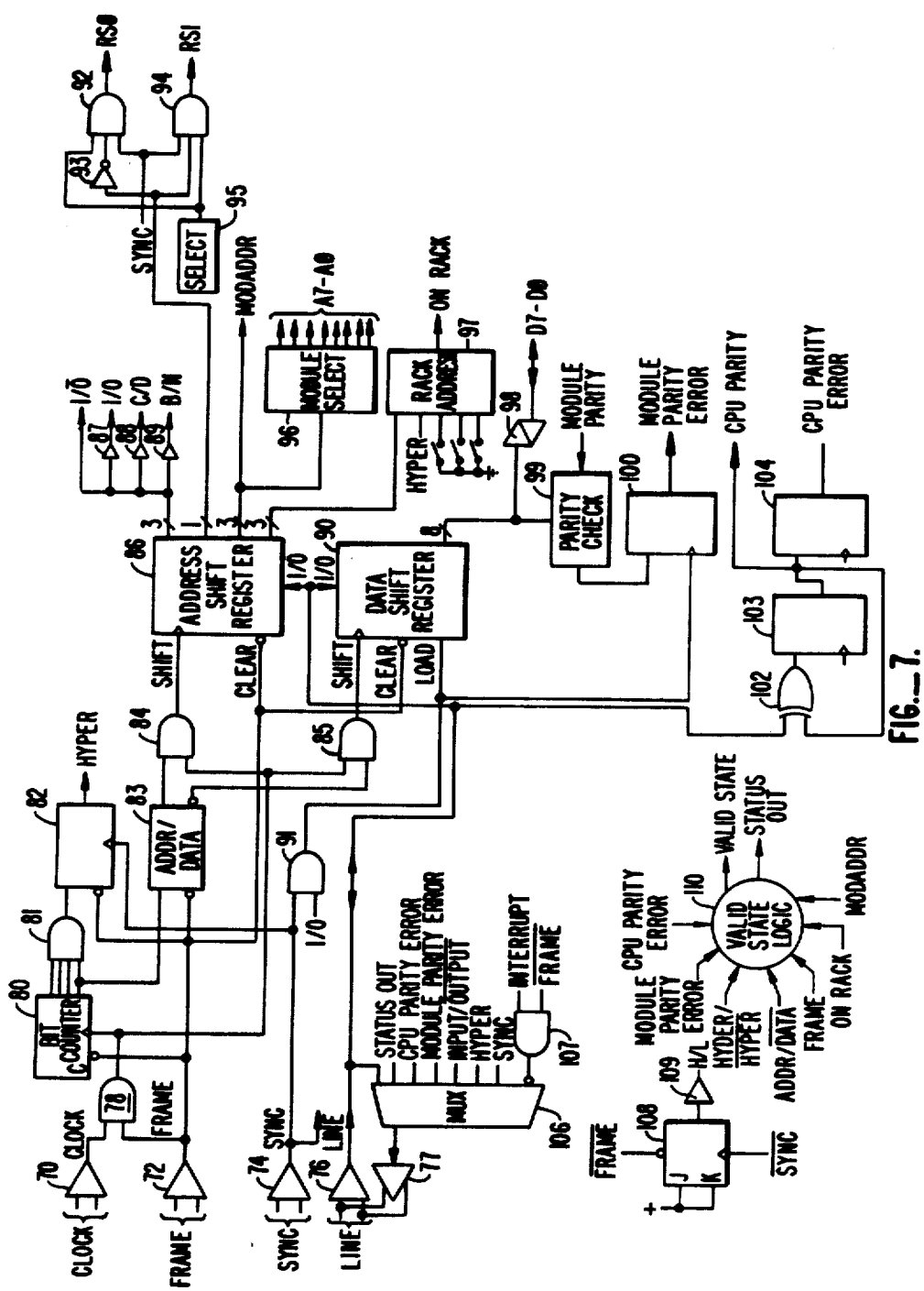

SERIAL INFORMATION TRANSFER PROTOCOL

BACKGROUND OF THE INVENTION

1. Field of the Invention

The present invention relates to the exchange of information over a bidirectional serial line. More particularly, the present invention relates to a serial information transfer protocol between a central processing unit and several peripheral modules.

2. Description of the Prior Art

Prior art computer architectures provide a central processing unit, memory, and various input and output devices within a computer cabinet. Information is exchanged over a parallel bus consisting of several lines, each of which carries one bit of information. Taken collectively, the lines provide several bits in parallel at the same time, referred to as a byte.

Often it is desirable to extend the domain of the central processing unit (CPU) within the computer's cabinet. It is not practical to extend a parallel bus for the following reasons:

(1) The cost of cable is quite expensive. In some applications a 68-conductor cable is required. The length of cable required to extend the CPU within a computer cabinet, from one equipment rack to another, adds a significant cost to the computer.

(2) The cost of connectors for 68-connector cable is a significant factor. Wiring such connectors is difficult and labor intensive.

(3) Each conductor within the cable must include a send and receive driver at each end, and corresponding circuitry for effecting bidirectional transfer of information. Significant amounts of circuit board space and driving energy are required to extend parallel bus signal in this way (4) Parallel buses are not readily shielded and as such are subject to transmission induced signal degradation due to environmental and line introduced noise and interference.

It is well known to provide serial duplex communications between a computer and a peripheral device, for example, as communications between a printer and computer according to an IEEE RS-232 protocol. Such known serial communications are not effective for extending a CPU because each serial line must be dedicated to a single peripheral device. Accordingly, only point-to-point communications are available using known serial communications protocols. To extend a CPU domain by these known techniques would require a separate serial bus for each peripheral device addressed. When adding several peripheral devices, for example, nine modules, the number of wires in an interconnecting cable becomes a significant cost factor, as does the hardware to drive the lines.

Another important factor in extending the domain of a CPU by either parallel or serial communications is the environment in which the computer is operated. For example, computers that operate assembly lines, referred to as programmable controllers, are highly specialized pieces of hardware that control such industrial processes as are found in foundries and factories. A foundry or factory environment is noisy, stressful to the components of the controller, subject to temperature and humidity extremes, and degradative of electronic communication. Reliability is crucial in controlling an industrial process—the wrong interpretation of information might produce improper equipment actuations with attendant disastrous results.

A further consideration, particularly important to programmable controllers, is that of flexibility. The domain of the CPU is often extended to provide control of improved or more complex processes that may be adapted at the manufacturing facility at a later date. It is desirable to reconfigure the CPU and add peripheral devices as needed. Parallel extensions add significant cost, serial extensions are not transparent, but rather impose a duplex protocol upon a central processing unit. Both approaches are unsatisfactory, in terms of cost, reliability, immunity to noise, and flexibility.

SUMMARY OF THE INVENTION

A central processing unit (CPU) extension is disclosed that consists of an interconnecting transparent serial bus, by which a parallel CPU domain is readily extended to a parallel peripheral module domain. A bidirectional serial protocol transfers information between the CPU and one or more peripheral module controllers referred to as rack masters. Each rack master, in turn, provides a parallel path to any number of peripheral modules associated therewith.

The interconnecting serial bus includes a frame line that defines a synchronous information exchange interval. The frame line propagates a frame signal from the central processing unit to define a beginning and an ending point of the information exchange interval. An interrupt structure is supported in the absence of a frame signal. Accordingly, communications from a rack master in the absence of a frame signal indicate an extraordinary rack master or peripheral module event.

A clock line propagates a synchronous information clock signal from the CPU during the information exchange interval. The rack master and peripheral modules receive a system reference in the form of the clock signal. In this way, operation of the rack master and its associated peripheral modules is synchronized to that of the central processing unit.

A sync line propagates a sync signal from the CPU and identifies the one or more discrete asynchronous information fields that may occur during the information exchange interval. The sync signal indicates that an information field is to begin or that an information field has ended. Accordingly, a level of redundancy is provided for verification, noise immunity, and reliability. An acknowledgement signal is provided in response to the sync signal, indicating that the sync signal was properly received and another information field may be sent.

A signal line propagates data, address, and control information between the CPU and its associated rack masters to provide serial, bidirectional information exchange therebetween. Information exchanged in this manner is transferred at a clock rate controlled by the synchronous information clock signal.

An information exchange interval is defined including discrete information fields in which information may be exchanged at a clock rate. Exchanges between the CPU and its associated rack masters on the signal line include addressing information for routing messages to a destination rack master and to a destination associated peripheral module. Information received at the rack master in serial fashion over the serial line is loaded into a shift register and thereafter shifted in parallel along a local parallel bus to the addressed peripheral module. In like manner, the peripheral module loads a parallel signal from the local parallel bus into a shift register within the rack master. This information is thereafter shifted out in serial fashion via the serial line to the CPU.

The present invention provides a flexible, reliable, and transparent multipoint communications interface between a central processing unit and any number of peripheral modules. Information is exchanged in a multipoint fashion having strong aspects of parallelism and yet requiring only the simple hardware arrangement of a serial bus.

DESCRIPTION OF THE DRAWINGS

FIG. 1 is a block diagram of a central processing unit coupled by a serial bus to a series of rack masters and/associated peripheral modules;

FIG. 2 is a block diagram of a central processing unit according to the present invention showing signals attendant with the serial bus protocol;

FIGS. 3A to 3C are timing diagrams showing information exchange between a CPU and a rack master;

FIGS. 4A to 4C are timing diagrams showing information exchange between said rack master and said CPU;

FIG. 5 is a flow diagram showing serial bus protocol at the CPU;

FIG. 6 is a block diagram of a portion of a CPU associated with generation and control of signals relating to serial bus protocol; and FIG. 7 is a block diagram of a rack master.

DESCRIPTION OF A PREFERRED EMBODIMENT

The present invention is an interconnecting and transparent serial bus for extending a central processing unit (CPU) to one or more racks of parallel peripheral modules. Bidirectional information transfer is accomplished according to a serial protocol. A block diagram of a central processing unit coupled by a serial bus to a series of rack masters and associated peripheral modules is shown in FIG. 1. A CPU 20, operated by a power source 22, controls a number of local peripheral devices 24 and 25 through a parallel bus 23. CPU 20 and associated peripherals are located in a rack 12.

As system needs grow, for particular remote location applications, such as robotics, or to increase system power to control more complex processes, it is desirable to extend the domain of CPU 20, rather than purchase a larger system. The present invention avoids the problems inherent in extending a parallel bus to proximate yet remote locations, such as additional racks within a common equipment cabinet. A serial bus 26 is provided by which several equipment racks 15, 16, and 18 are brought into the domain of CPU 20. Serial bus 26 is interfaced to rack-associated peripheral modules through rack masters 27 and 34. Rack master 27 includes associated power supplies 28 and 29, is configured with racks 15 and 16, and controls peripheral module bays 31 and 32 through parallel bus 30. Rack master 34 is associated with power supply 35, and controls peripheral module bays 37 and 38 through parallel bus 36.

Accordingly, the present invention converts the parallel domain of CPU 20 to a bidirectional serial communications line which may be extended to any number of rack masters. The rack masters interface the serial communication line to a parallel bus by which a number of associated peripheral modules are operated directly from CPU 20. Thus, a transparent parallel-to-serial and serial-to-parallel communications protocol is provided. In this way, a system may be extended as necessary without the expense and lack of reliability of parallel protocol between interconnect points, and without the need of adding additional intelligence to the system in the form of remote processors coupled in a network configuration.

A block diagram of a CPU according to the present invention showing signals attendant with the serial bus protocol is provided in FIG. 2. CPU 20 includes parallel bus 26 and produces the following defined signals:

(1) Frame—defines a synchronous information exchange interval;

(2) Clock—operates during the information exchange interval to define a synchronous information clock rate. Additionally, the clock provides the rack masters and associated peripheral modules with a system reference;

(3) Sync—defines at least one discrete asynchronous information field during the information exchange interval; and (4) Line—provides serial, bidirectional information exchange between the central processing unit and the peripheral modules at a rate controlled by the clock.

Timing diagrams showing information exchange between the CPU and a rack master, and between the rack master and the CPU, according to the serial I/O transfer protocols described herein, are shown in FIGS. 3 and 4. The description herein includes a discussion of the order of bits in each type of transfer, normal address and hyper-address (address to rack master hardware) and interrogation address procedures, four-bit, eight-bit, and sixteen-bit data transfers, and clock operation. A flow diagram showing serial bus protocol at the CPU is provided by FIG. 5 (discussed in detail below).

The serial bus is transparent to information transferred thereon (unless the information is particularly intended for a rack master, for example, hyper-address). Except for extraordinary circumstances, address and information transfer always occur during an interval defined by the frame signal. All transfers of address or data information end or begin with a sync signal. All such transfers include a parity bit that reflects the data or address bits that have been transferred across the serial bus. Parity checking is only provided on bits traveling via the bus. Accordingly, there is no knowledge of high order or low order (H/L) byte portions (for some eight and all sixteen bit information transfers) and the effect on parity from a point of view of the peripheral module ultimately addressed. The rack master unravels the parity on a data read before sending the parity bit back to the CPU via the bus.

The protocol of bit transfer across the serial bus may be described as including an address protocol and a data protocol. Address protocol is as follows:

N/B MS0 MS1 MS2 RS0 RS1 RS2 R/W C/D PAR STRAV

Where:

N/B is true when an eight-bit numeric (data to or from analog I/O modules) transfer is to be made or when a block transfer (a large amount of data) is to be made. For example, a transfer of data to a Universal Asynchronous Receiver-Transmitter (UART) or other such coupler. N/B is false for a binary transfer of four bits.

MS0-2 are the module select bits that select one of eight peripheral modules in a rack associated with the receiving rack master. Accordingly, a particular peripheral module responds to its unique address. (Other embodiments of the invention may provide additional module select bits to access more peripheral modules.)

RS0-2 are the rack select bits that select one of eight racks in the local environment. Accordingly, a particular rack master responds to its unique address. (Other embodiments of the invention may provide additional rack select bits to access more racks.)

R/W is the read/write bit that, when set, determines whether a peripheral module is to receive data (write) or send data (read).

C/D is the command/data bit that, when set, determines whether control information (command) or data is to follow the address.

PAR indicates odd parity. Thus, if all bits are zero then parity is one for all bits, including N/B, MS, RS, R/W, and C/D.

STRAV is the sync rack available sequence that operates as follows: The sync signal is used at the end of an address sequence by the CPU. The rack master responds that it has recognized the address by sending an acknowledge (ACK) signal (normally within one bit time, described below). If the rack master takes longer, the transfer is slowed. The response time before ACK is sent is watchdogged by the CPU. If the ACK does not appear within the watchdog time, an interrupt is provided to the CPU. If the ACK is received, then the sync line is lowered. If the rack master has control of the rack bus, it lowers its ACK signal. If the rack master does not have control of the rack bus, it keeps the ACK signal true until the rack bus is released.

Rack master control of the rack bus is dependent on operation of the peripheral module associated with the rack. If the serial bus is not available, the CPU waits. The CPU watchdogs the availability of the bus. If the CPU is blocked, then the frame signal is made false and a CPU fail signal is made true. Once the frame signal has gone false, the rack master releases line and an interrupt is provided to the CPU.

Two signals that are not sent across the serial bus as address bits, but which serve as address bits, H/L and ADR, are generated by the rack master hardware, as follows:

H/L is the high/low byte or nibble bit that indicates which portion of a byte (high or low) is to be sent. H/L is by definition set to zero when the address arrives by rack master hardware. H/L is then set to one after the first data transfer. H/L is thereafter toggled with each new data transfer until the frame signal goes false.

ADR is the high/low byte bit when N/B is not true and there are more than two data exchanges (of four bits each). ADR is used in addressing sixteen-bit transfers. In the present embodiment of the invention, there are never more than four transfers of four bits without a change in the frame signal. Accordingly, the rack master has a two bit counter, the low order bit being H/L and the high order bit being ADR. However, ADR is not allowed to go to one unless N/B is false. Additionally, the counter is cleared to zero when the frame signal goes false.

Hyper-address protocol (address to the rack master and not an associated peripheral module) is as follows:

RS0 RS1 RS2 RS3 R/W C/D PAR STRAV

Where:

RS0-3 are the rack select bits for selecting one of eight racks in a local environment.

R/W is the read/write bit.

C/D is the command/data bit.

PAR is odd parity. If all bits are zero, then parity is one for all bits, such as RS, R/W, and C/D.

STRAV is the sync rack master available sequence. This sequence works as described above, except that the rack master does not check for rack bus control because the exchange is between the CPU and the rack master only. Thus, as soon as the CPU lowers sync, the rack master lowers ACK.

An eight bit information transfer to the rack master is described as follows:

B0+x B1+x B2+x B3+x B4+x B5+x B6+x B7+x PAR SYNC

Where:

x is zero if H/L is false or eight if H/L is true.

B0-B15 are the data bits: B0 is the least significant bit. The order of transfer is: bits 0-7, bits 8-15, bits 0-7, and so on (if there are more than two bytes). Only the first byte is required.

PAR is odd parity (if all bits are zero, parity is one) for all bits, B0+x to B7+x. Parity that is received from the parallel bus has H/L and ADR included. These signals are removed by the rack master, which then verify that parity is the same as that received from the serial bus.

SYNC is the signal sent by the CPU to indicate that an information exchange is complete, to verify correct parity from a peripheral module, or to send an ACK if the peripheral module sends ACK. The CPU waits for a fixed time. If ACK is not received in that time, the CPU releases SYNC and logs an error. If the CPU does receive ACK, it removes SYNC and waits for the ACK to go away. This step is watchdogged. Additionally, the CPU looks at ACK as it makes SYNC to be certain that ACK is not true. An error is indicated if ACK is true at the start of SYNC.

A four bit information transfer *to* the rack master is as follows:

B0+x B1+x B2+x B3+x PAR SYNC

Where:

x is zero if H/L is false or four if H/L is true and ADR is false. X is eight or twelve, respectively if ADR is true.

B0-B15 are the data bits: B0 is the least significant bit. The order of nibble transfer is bits B0-3, bits B4-7, bits B8-11, and bits B12-15. Only the first nibble is required.

PAR is odd parity (if all bits are zero, parity is one) for all bits, B0+x to B3+x. Note that the PAR received from the parallel bus has H/L and ADR included. The rack master removes these signals and verifies that this PAR signal is the same as that received from the serial bus.

SYNC is the signal sent by the CPU to indicate the data exchange is complete, to verify correct parity from the peripheral module, and to send an ACK if the peripheral module sends ACK. The CPU waits for a fixed time. If ACK is not received in this time, SYNC is released and an error is logged. If ACK is received, SYNC is removed and the CPU waits for ACK to go away. This is watchdogged. Additionally, the CPU looks at ACK as it makes SYNC to be sure that ACK is not true. An error is indicated if ACK is true at the start of SYNC.

An eight bit numeric transfer *from* the rack master is as follows:

SYNC PAR B7+x B6+x B5+x B4+x B3+x B2+x
B1+x B0+x

Where:

x is zero if H/L is false, or eight if H/L is true.

B0–B15 are data bits: B0 is the least significant bit. The order of transfer is bits 0–7, bits 8–15, bits 0–7, and so on (if there are more than two bytes). Only the first byte is required.

PAR is odd parity (that is, if all bits are zero, parity is one) for all bits, such as B0+x to B7+x. The pair that is received from the parallel bus has H/L and ADR included. The rack master removes these signals and send par onto the serial bus. The CPU uses par to determine if the data parity is correct.

SYNC is the signal sent by the CPU to indicate that the information exchange is to start. The rack master must read the information and parity from the associated peripheral module and send an ACK if the peripheral module sends ACK. The CPU waits for a fixed time. If an ACK is not received in that time, the CPU releases SYNC and logs an error. If the CPU does receive ACK, it removes SYNC and waits for the ACK to go away. This is watchdogged. Additionally, the CPU looks at ACK as it makes SYNC to be sure that ACK is not true. An error is indicated if ACK is true at the start of SYNC.

A four bit information transfer *from* the rack master is as follows:

SYNC PAR B3+x B2+x B1+x B0+x

Where:

x is zero if H/L is false or four if H/L is true and ADR is false. If ADR is true, then x is eight or twelve, respectively.

B0–B15 are the data bits: B0 is the least significant bit. The order of nibble transfer is bits B0–3, bits B4–7, bits B8–11, and bits B12–15. Only the first nibble is required.

PAR is odd parity (that is if all bits are zero, parity is one) for all bits, B0+x to B3+x. The PAR that is received from the parallel bus has H/L and ADR included. The rack master removes these and sends the resulting signal onto the serial bus. The CPU uses the signal to determine if data parity is correct.

SYNC is the signal sent by the CPU to indicate that the information exchange is to start. The rack master reads data and parity from the addressed peripheral module, and sends an ACK if the peripheral module sends ACK. The CPU waits for a fixed time. If an ACK is not received in that time, the CPU releases SYNC and logs an error. If the CPU does receive ACK, it removes SYNC and then waits for the ACK to go away. This is watchdogged. Additionally, the CPU looks at ACK as it makes SYNC to be sure that ACK is not true. An error is indicated if ACK is true at the start of SYNC.

There are two types of information transfer: numeric (NUM) and binary (BIN). A NUM output information transfer, sequence is as follows:

(1) Start frame
 (2) Address, N/B=1, C/D=D, R/W=W
 (3) Command byte #1 (bit 7=BX)
 (4) Command byte #2 (normally register address)
 (5) Address, N/B=1, C/D=D, R/W=R
 (6) eight-bit NUM output: bits 0–7
 (7) eight-bit NUM output: bits 8–15
 (8) N eight-bit NUM outputs (if more than two bytes are output)
 (9) End frame FIGS. 3A–3C show such outputs as follows: eight bits, four bits at a time (FIG. 3A); eight bits, eight bits at a time (FIG. 3B); sixteen bits, eight bits at a time (FIG. 3C).

A NUM input information transfer sequence is as follows:

(1) Start frame
 (2) Address, N/B=1, C/D=D, R/W=W
 (3) Command byte #1 (bit 7=BX)
 (4) Command byte #2 (normally register address)
 (5) Address, N/B=1, C/D=D, R/W=R
 (6) eight-bit NUM input, bits 0–7
 (7) eight-bit NUM output, bits 8–15
 (8) N eight-bit NUM inputs (may be more than one byte)
 (9) End frame.

FIGS. 4A–4C shows such input sequences as follows: eight bits, four bits at a time (FIG. 4A); eight bits, eight bits at a time (FIG. 4B); and sixteen bits, eight bits at a time (FIG. 4C).

Some of the various input and output sequences that may be provided by the present invention are as follows:

(A) eight-bit, output (FIG. 3A)
 1. Start FRAME.
 2. Address, N/B=0.
 3. four-bit output, bits 0–3.
 4. four-bit output, bits 4–7.
 5. End FRAME.
(B) eight-bit, input
 1. Start FRAME.
 2. Address, N/B=0.
 3. four-bit input, bits 0–3.
 4. four-bit output, bits 4–7.
 5. End FRAME.
(C) sixteen-bit, output
 1. Start FRAME.
 2. Address, N/B=0.
 3. four-bit output, bits 0–3.
 4. four-bit output, bits 4–7.
 5. four-bit output, bits 8–11.
 6. four-bit output, bits 12–15.
 7. End FRAME.
(D) sixteen-bit, input
 1. Start FRAME.
 2. Address, N/B=0.
 3. four-bit input, bits 0–3.
 4. four-bit output, bits 4–7.
 5. four-bit input, bits 8–11.
 6. four-bit output, bits 12–15.
 7. End FRAME.
(E) four-bit, output
 1. Start FRAME.
 2. Address, N/B=0
 3. four-bit output, bits 0–3.
 4. End FRAME.
(F) four-bit, input
 1. Start FRAME.
 2. Address, N/B=0
 3. four-bit input, bits 0–3.
 4. End FRAME.
(G) HYPER ADDRESS COMMAND OUTPUT
 1. Start FRAME.
 2. Hyper-Address (Rack Address)
 3. four-bit output, bits 0–3.

4. End FRAME
(H) HYPER ADDRESS STATUS INPUT
1. Start FRAME.
2. Hyper-Address (Rack Address)
3. four-bit input, bits 0-3.
4. End FRAME.

Other bus information transfer sequences include CPU fail (CPUF) that provides signals indicative of CPU failure to the rack masters. This condition is indicated on the serial bus by having SYNC high when FRAME is low. Such situations can occur either at power-up or power-down time for the CPU, when the CPU fails, or when a rack master locks up on the serial bus. Thus, when power-up occurs there is an interval when CPUF is sent on the serial bus. The same situation occurs on power-down. When an actual CPU fail occurs, the condition is indicated on the serial bus until the power is turned off. When a rack master locks up the serial bus (for example, during STRAV), the CPUF lasts for only a few microseconds.

A serial bus interrupt (SIT) is sent by the rack master during the time that FRAME is false and there is an interrupt signal on the rack masters rack. The interrupt is provided when rack master makes line true. When the CPU sees FRAME low and line high an interrupt is then detected.

The rack master does the following with respect to parity:

(1) Output from the CPU:

The rack master checks the parity of all groups of bits when SYNC arrives. In the case of output data, the rack master sends the data (either four bits or eight bits) to the appropriate peripheral module and then checks the parity returned from the peripheral module, taking into account H/L and ADR. The rack master then sends the peripheral module's ACK to the CPU if the parity check is valid. The rack master memorizes incorrect parity and reports it in its status either (a) having received correct parity from the CPU, or (b) from the peripheral module. Additionally, if there is incorrect parity on an address, the rack master is blocked from responding to SYNC. When the rack master receives incorrect parity on data from the CPU, there is no ACK, because the rack master does not send the data on to the selected peripheral module. Therefore, the rack master cannot receive an ACK from the peripheral module to forward to the CPU.

(2) Input to the CPU:

The rack master does not have to check the parity of the data input by the CPU to intercept (HALT) ACK, but rather sends the parity bit as received from the selected peripheral module (after removing H/L and ADR). The CPU checks for correct or incorrect parity.

An error in H/L or ADR somewhere between the rack master and the selected peripheral module and sends back a parity error to the CPU. However, the rack master checks the parity and, upon receiving incorrect parity from the selected peripheral module, memorizes that fact in its status register. The CPU decides whether the rack master clear the error from its resister on a new exchange or upon reading of rack master status by the CPU.

Both edges of the serial bus clock are significant, depending on what is occurring. During output of addresses, data, and parity, the trailing edge of clock is used by the rack master to clock the information into its registers. The CPU shifts the new data out on the trailing edge of clock.

During input of data and parity, the trailing edge of clock is used by the rack master to clock its shift registers and to enable the data or parity bits onto line. The CPU uses this edge (one clock later) to clock the information into its registers. The apparent difference between the interval when data is sent and when it is latched between input and output relates to clock and data travelling together during output. During input the clock is sent by the CPU, the rack master sends the data when it receives clock; the CPU clocks the data in after this travel on the serial bus. Accordingly, during input there are two traverses of the serial bus.

A flow diagram showing serial bus protocol at the CPU as shown in FIG. 5. It should be appreciated that, in view of the flow diagram of FIG. 5 and the following discussion in support thereof, an appropriate computer program for operating a CPU in accordance with the present invention can be readily written by one skilled in the art without undue experimentation.

At the start of a data exchange sequence across the serial bus, all lines—frame, clock, sync, and line—are lowered (200). Line is checked for an active state (201) and, if high, an interrupt is reported to the CPU (202). If line is not high, then sync is checked for its state (203). If sync is high, then a CPU fail condition is reported (204) and appropriate indications are made to a system operator.

If both line and sync are not high, then the CPU raises the frame signal (205), and begins sending the clock signal (206). (In some embodiments of the invention, clock is continuously sent and controlled at the rack master by the frame signal, see FIG. 7, for example.) Thereafter, line is set in a transmit mode (207) and an address is sent to the rack master across the serial bus (208).

If the address sent is a hyper-address, that is, to the rack master (209), then the CPU sends appropriate control data to the rack master (210) and thereafter lowers the frame signal (211). If a normal address is sent, that is, to the peripheral modules associated with the rack master hardware, then the CPU raises the sync signal (212).

The CPU then waits to receive an acknowledgement—ACK—signal (213). The CPU watchdogs line to receive the ACK from the rack master (214). If the ACK signal is not received, then an interrupt is provided to the CPU (215). If the ACK signal is received, then the CPU waits for the ACK signal to be lowered (216). If the serial bus is not available to the rack master, or if there are other problems at the rack master end (217), then a watchdog timer in the CPU times out (218). As a result, a CPU lowers frame (219) and can either enter a diagnostic mode or continue to wait and try to resend the address and data. If the watohdog timer does not time out before the ACK siqnal is lowered, then the serial bus is available (220) and the CPU lowers the sync signal (221).

The CPU may either send information to the rack master(s) over the serial bus or receive information from the rack master(s) over the serial bus (222). During a first transaction, information is usually sent (223). If ACK is raised at a time prior to, or during the sending of data (224), then an error is logged by the CPU (225). If ACK is not raised during the sending of data, then when the transmission is completed, the CPU raises the sync signal (226). Thereafter, the CPU waits for the ACK signal (227).

If the ACK signal is not received (228) by the time a CPU watchdog timer times out, then the sync signal is lowered (229) and an error is logged by the CPU (230). If the watchdog timer does not time out and the ACK signal is received, then the CPU lowers the sync line (231). If the ACK signal is raised after the CPU lowers sync (232), then a CPU watchdog timer is set (233) to wait for the ACK signal to clear. If the watchdog timer times out, then an error is logged by the CPU (234). If the ACK signal clears, or is not raised, then the exchange of information continues in a like manner (235) until completed, at which time the frame signal is lowered (236).

If the CPU is to receive data, the line is conditioned in a receive mode (237). The CPU checks to see if the ACK signal is raised (238) and, if so, an error is logged (239). If ACK is not raised, then the CPU raises the sync signal (240) and waits to receive an ACK signal from the rack master (241). If an ACK signal is not received from the rack master after sync is raised, then a CPU watchdog timer is set (242) which, upon time out, causes the CPU to lower sync (243) and log an error (244).

If an ACK signal is received, then the CPU lowers sync (245). Thereafter, the CPU checks to see if ACK is raised (246) and, if so, sets a watchdog timer once again (247) that, upon time out, logs an error with the CPU (248).

If ACK is not raised or has cleared after the CPU lowers sync, then the CPU is in a condition to begin receiving data via the rack master from the peripheral modules (249). The CPU continues operation in such manner until the transaction is completed (250), at which time the CPU lowers frame (251).

A block diagram of a portion of the CPU associated with generation and control of signals relating to the serial bus protocol is shown in FIG. 6. Microprocessor 40 couples the programmable controller or CPU to the various portions of the serial bus via data and address bus 42. The serial interface portion of the CPU is controlled by microprocessor generated addresses that are forwarded along data and address bus 42 and accumulated in an address register 44.

An address decoder 45 converts the control address generated by the microprocessor to a series of signals 1-8. These signals are generated in sequence and as necessary to effect coordinated operation of the serial interface at the CPU end. Thus, the various components shown in FIG. 6 include numbered lines that correspond to signals generated at address decoder 45 under control of microprocessor 40.

The frame signal is generated by the microprocessor as described in FIG. 5 and coupled through a frame flip-flop 46 to a frame buffer 47. Thereafter, the frame signal is routed across the serial bus to the rack master.

In a like manner, the sync signal is generated by the microprocessor as described in FIG. 5 and coupled through a sync flip-flop 48 to a sync buffer 49. Thereafter, the sync signal is routed across the serial bus to the rack master.

The clock signal is provided by the CPU or system clock to the rack master via the serial bus through a buffer 50. In the preferred embodiment of the invention, the system clock signal is always produced and coupled to the rack master via the serial bus; frame and sync signals are controlled by signals produced at address decoder 45 under control of microprocessor 40.

Data and address information to be coupled to the rack master and thereafter to the various remote peripheral devices is received from or driven onto line by buffers 53 and 54, respectively. Buffer operation (and therefore line transmit or receive configuration) is determined by the state of a line flip-flop 52 that is, in turn, operated by control signals generated at address decoder 45. Information to be driven onto line and to the rack master is coupled from data and address bus 42 by a buffer 60, which is controlled by signals generated at address decoder 45, and shifted into shift register 56. Shift register 56 is controlled by signals generated at the address decoder in such manner that data shifted into the shift register in parallel from buffer 60 may be coupled through a multiplexor 62 and thereafter driven onto line via buffer 54.

Information received from the rack master, and associated remote peripheral modules, is shifted into the shift register in serial fashion from buffer 53 and is thereafter shifted outward in parallel fashion to the data and address bus via buffer 58, all under control of signals generated at address decoder 45.

Parity and error checking is provided by multiplexors 62 and 64, exclusive-OR gate 65, and parity and error flip-flops 66 and 67, respectively. Parity information is coupled to the data and address bus via buffer 59; error information is coupled to the data and address bus via buffer 61.

The microprocessor is readily programmed as described in FIG. 5 to provide correct address information to address decoder 45 to produce the appropriate signals to operate the various hardware devices associated with the microprocessor/serial bus interface shown in FIG. 6. The interface shown may be constructed in any number of equivalent embodiments and, for that reason, the circuit and computer program described in FIGS. 5 and 6 is provided herein only as an example of the preferred embodiment. There are equivalent embodiments that also function efficiently in accordance with the teachings of the present invention.

A block diagram of a rack master is provided in FIG. 7. The frame signal is coupled to the rack master from the serial bus via a buffer 72; the clock signal is coupled from the serial bus to the rack master via a buffer 70; and the sync signal is coupled from the serial bus to the rack master via a buffer 74. An AND gate 78 is operated as a switch to isolate the clock signal from the rack master in the absence of the frame signal. This arrangement prevents propagation and noise-induced clock error because the clock signal, although not always driving the rack master, is always present at the rack master.

Line is coupled from the serial bus to the rack master via buffers 76 and 77, each of which provides one direction of bus communication: buffer 76 is the receive buffer, and buffer 77 is the transmit buffer. Information received via buffer 76 from the CPU and over line, is coupled to address shift register 86 and data shift register 90. A bit counter 80 is operated by clock in the presence of the frame signal to produce a count which is decoded by AND gate 81 and flip-flop 83. When a particular count is present, AND gate 81 operates flip-flop 82 to indicate that a hyper-address has been sent from the CPU to the rack master. A hyper-address, as discussed above, is an address solely to the rack master hardware to determine status or to enter a command mode.

Bit counter 80 also counts until a particular count is achieved indicating that a complete address has been received. When this count is achieved, address and data flip-flop 83 toggles, turning off AND gate 84 and turning on AND gate 85, and thereby turning off shift register 86 and turning on shift register 90. Thus, the rack master hardware first looks at line through an address shift register which accumulates a series of bits corresponding to the address sent over the serial bus. Once the address is accumulated, the counter operates a flip-flop to steer the signal received over line into a data shift register, wherein data sent over line is accumulated.

Before data can be shifted to or from the peripheral modules, the destination rack master, destination rack (in a multirack rack master environment), and the destination module must be addressed. Additionally, mode of operation must be determined. The address shift register includes a series of outputs including input and output control lines, control or data lines, block or nibble mode lines—all of which are described above. The input/output lines (I/O), the control and data lines (C/D), and the block or nibble line (B/N) are provided with a buffered output through buffers 87-89, respectively.

A rack address decoder 97 receives a portion of the address decoded by address shift register 86 and compares that to an address set by switch assembly S, which may be a dual-in line-pin (DIP) switch. If the switch assembly and decoded address are identical, then the rack master knows that it has been selected and produces the ON RACK signal. In this way, a particular rack master is selected.

In some embodiments of the invention, a rack master may control more than one equipment rack. For this purpose, a rack select circuit is also provided, comprising AND gates 92 and 94, inverter 93, and select switch 95. In this way, a particular rack may be addressed along with the particular rack master. Although only two rack select signals are shown, RS0 and RS1, several such signals may be provided as is necessary for the application to which the invention is put.

Peripheral module select is accomplished by module select decoder 96. Eight such module select lines are provided for selecting up to eight peripheral modules associated with the rack master. It is possible to provide additional decoding so that a significantly larger number of peripheral modules may be addressed by a single rack master. When a module select signal is present, the module address signal MODADDR is produced, indicating that a hyper-address sequence is not in progress.

Data shift register operation is a function of data transmission or data reception at the rack master. An AND gate 91 is provided by which shift register 90 may be configured to shift data from line, or load data from an internal parallel data bus. The internal parallel data bus couples the peripheral modules to the shift register to shift data out onto line to be sent to the CPU, or to receive data accumulated from the CPU line via the shift register. A bidirectional buffer 98 is provided for shifting data to and from the rack master and the peripheral modules.

Parity checking is provided by a parity check circuit 99 that receives a module parity signal and produces a module parity error signal with a flip-flop 100 in the event a parity error is detected. In a like manner, an exclusive-OR gate 102 and flip-flops 103 and 104 are provided to detect parity from the CPU and to indicate a CPU parity error.

All rack master states are reported to and logged by valid state logic circuit 110. For purposes of simplicity, only a simple symbol is shown for the valid state logic circuit. The valid state logic circuit is preferably constructed from combinational logic. Thus, the circuit need only receive the signals indicated and produce appropriate valid state and status out signals.

The status out signal, along with other status signals, is coupled to a multiplexer 108 to produce a status and rack master report which, in turn, is coupled by a buffer 77 and over line to the CPU. An interrupt is reported in the absence of frame as detected by AND gate 107. The high/low (H/L) byte counter is comprised of JK flip-flop 108 and inverter 109. The byte counter circuit operates on each transition of the sync signal, which corresponds to high and low order byte portions as described above.

Accordingly, a significantly improved form of serial communications is provided for interfacing a parallel CPU domain to a parallel remote peripheral device domain. Prior art communications lack reliability and the high cost associated with extending a parallel CPU bus are eliminated. Yet, the invention retains the versatility of multipoint communications not heretofore available with a serial communications system.

I claim:

1. In an information processing system an apparatus for transferring information between a central processing unit (CPU) and at least one peripheral module, the apparatus comprising:

line means coupled to said CPU and to said at least one peripheral module for providing serial transmission of address signals and serial bidirectional transmission of data signals;

means coupled to said at least one peripheral module for generating a frame signal, said frame signal having a first transition for initiating an address transmission phase and a second transition for terminating a data transmission phase;

means coupled to said at least one peripheral module for generating a clock signal for defining a synchronous transmission rate during the data transmission phase and the address transmission phase;

means coupled to said at least one peripheral module for generating a sync signal for terminating the address transmission phase and for delimiting data fields transmitted during the data transmission phase; and means coupled to said line means and to said sync signal generating means and responsive to a first transition of said sync signal for generating on said line means an acknowledgement (ack) signal having a first transition verifying correct receipt of signals transmitted on said line means;

said sync signal generating means being further operative to cause a second transition of said sync signal in response to the first transition of said ack signal and said ack signal generating means being further operative to cause a second transition of said ack signal in response to the second transition of said sync signal.

2. The apparatus of claim 1, further comprising:

a plurality of peripheral modules; and a rack master, coupled to each of said peripheral modules and to said line means for interfacing said peripheral modules with said CPU.

3. The apparatus of claim 2, said rack master further comprising:

interrupt means, coupled to said line means for reporting extraordinary peripheral module and rack master events to said central processing unit when said frame signal is absent.

4. The apparatus of claim 2, said rack master further comprising:
   address means, for directing data signals received via said line means from said central processing unit to a selected one of said peripheral modules in response to address signals received via said line means.

5. The apparatus of claim 2, further comprising:
   a plurality of rack masters, each of which is operable to interface a plurality of associated peripheral modules to said line means.

6. The apparatus of claim 5, each of said rack masters further comprising:
   rack address means, responsive to a rack address signal directed to a particular one of said rack masters and received at each of said rack masters from said central processing unit via said line means, for selecting operation of said particular rack master.

7. The apparatus of claim 2, said rack master further comprising:
   parity means for detecting and reporting parity errors occurring during the data transmission phase.

8. The apparatus of claim 1, further comprising:
   means for reporting a CPU failure when an asynchronous information field is present on said bus in the absence of a frame signal.

9. The apparatus of claim 1, further comprising:
   watchdog means for monitoring and timing serial, bidirectional information exchanges between said central processing unit and said peripheral module, and for logging a system error when said information exchange is not formated within a discrete information field.

10. In an information processing system including a central processing unit and at least one peripheral module, a process for coupling a parallel central processing unit domain with a parallel peripheral module domain via an interconnecting serial bus, comprising the steps of:
    generating a frame signal having a first transition for initiating an address transmission phase and a second transition for terminating a data transmission phase;
    generating a clock signal for defining a synchronous transmission rate during the address transmission phase and the data transmission phase;
    generating a sync signal for terminating the address transmission phase and for delimiting data fields transmitted during the data transmission phase; and
    providing on a line means serial, bidirectional transmission of data signals and serial transmission of address signals between said central processing unit and said peripheral module at said clock rate
    generating, in response to a first transition of said sync signal, an acknowledgement (ack) signal, said ack signal having a first transition verifying correct receipt of signals transmitted on said line means;
    generating, in response to the first transition of said ack signal, a second transition of said sync signal; and
    generating, in response to the second transition of said sync signal, a second transition of said ack signal.

11. The process of claim 10, further comprising the step of:
    interfacing a plurality of peripheral modules with said serial bus for information exchange between said peripheral module and said central processing unit via a rack master coupled to said serial bus remotely from said central processing unit.

12. The process of claim 11, further comprising the step of:
    reporting extraordinary peripheral module and rack master events to said central processing unit with an interrupt signal generated when the frame signal is absent.

13. The process of claim 11, further comprising the step of:
    addressing one of a plurality of rack masters.

14. The process of claim 11, further comprising the step of:
    addressing one of a plurality of peripheral modules.

* * * * *